United States Patent Office 3,756,944
Patented Sept. 4, 1973

3,756,944
CATALYTIC PROCESS FOR HYDRODESULFURIZING HYDROCARBONS
Tadashi Ishiguro and Akio Okagami, Tokyo, and Seiichi Matsuoka, Yokohama, Japan, assignors to Japan Gasoline Co., Ltd., Tokyo, Japan
No Drawing. Continuation-in-part of application Ser. No. 871,752, Aug. 19, 1969, which is a continuation-in-part of application Ser. No. 523,899, Feb. 1, 1966, both now abandoned. This application Feb. 25, 1971, Ser. No. 119,015
Claims priority, application Japan, Feb. 2, 1965, 40/5,596
Int. Cl. C10g 23/02
U.S. Cl. 208—217       8 Claims

ABSTRACT OF THE DISCLOSURE

A process for hydrodesulfurizing a hydrocarbon which contains sulfur impurities by contacting the impure hydrocarbon with a gas at a temperature of 200–450° C. in the presence of a catalyst. The gas contains at least 10 mol percent of hydrogen and carbon oxide in the form of carbon monoxide and/or carbon dioxide. The catalyst consists essentially of nickel subsulfide and comprises nickel and sulfur in an atomic ratio of 1:0.5–0.8. The process results in the hydrogenolysis of only the sulfur impurities contained in the hydrocarbon but without any appreciable hydrogenation of the carbon oxides.

CROSS REFERENCE TO RELATED APPLICATION

This is a continuation in part of application Ser. No. 871,752, filed Aug. 19, 1969, abandoned, which is a streamlined continuation application Ser. No. 523,899, filed Feb. 1, 1966, now abandoned.

BACKGROUND OF THE INVENTION

Field of the invention

The invention relates to hydrodesulfurizing of hydrocarbons containing sulfur compounds.

Prior art

In the process of hydrodesulfurizing hydrocarbons using a hydrogen-containing gas, it has been a common practice to utilize a gas rich in hydrogen content but low in carbon dioxide and carbon monoxide content, except for certain specific cases. Heretofore, it has been considered undesirable to use a hydrogen-containing gas in which carbon monoxide, in particular, is present. Such a gas has been considered undesirable for the following reasons. Carbon monoxide is liable to be converted to methane when it is subjected to hydrogenation during the desulfurization process. Moreover, since methane formation is an exothermic reaction, it has been extremely difficult to control the temperature of the desulfurization operation. An excessively elevated reaction temperature causes deterioration of the desulfurization catalyst used and requires an increase in the amount of hydrogen consumed all of which adversely affect the hydrodesulfurization itself which constitutes the principal reaction. Therefore, except for some specific cases where the formation of methane is desired and also where it is intended to utilize the heat of reaction of methanation for preheating of a feed stock, gases which contain large amounts of carbon oxides have not been used in the process of hydrodesulfurization.

A number of hydrodesulfurization methods have been proposed and have put in practice. In any of these proposed methods, however, measures of some kind or another have been invariably taken, in those cases where the hydrogen-containing gas used in the desulfurization process contained carbon monoxide, in order to decrease the concentration of the latter. Such measures include, for example, the provision of a gas-purifying vessel in the upper stream of the desulfurizing vessel so that the water vapor acts upon the gas which contains carbon monoxide, to thereby convert the latter into carbon dioxide and hydrogen. Another measure contemplates the provision of such an additional vessel to effect conversion of carbon monoxide into methane therein. These measures are, however, not desirable, since the former requires an additional extra reaction unit while the latter has a disadvantage that the hydrogen concentration is decreased. In addition, such decrease in the concentration of hydrogen necessitates a further elevation of the pressure of the feed gas in order to raise the partial pressure of hydrogen to insure successful desulfurization.

SUMMARY OF THE INVENTION

According to the invention, a hydrocarbon containing sulfur impurities is contacted with a hydrogen-containing gas in the presence of a catalyst and as a result, the hydrocarbon is hydrodesulfurized. The hydrocarbon includes petroleum fractions such as gasoline, light oil, kerosene, naphtha and thermally cracked gases such as natural gas, liquefied petroleum gas or naphtha and hydrocarbon mixtures from coal tar.

The hydrogen-containing gas may be any one or more of a large group of hydrogen-containing gases so long as the gas contains at least 10 mol percent hydrogen. The hydrogen-containing gas includes carbon oxides such as carbon monoxide and/or dioxide. The total amount of carbon oxides must not exceed about 65 mol percent and preferably the carbon monoxide should be about 40 mol percent or less, while the carbon dioxide should be about 25 mol percent or less.

The catalyst consists essentially of nickel subsulfide in the solid state with the atomic ratio of nickel: sulfur being 1:0.5–0.8. The catalyst is prepared by sulfiding nickel with a sulfiding agent which is $H_2S$, $CS_2$ gases containing $H_2S$, and sulfur compounds such as mercaptans, disulfides, thiophenes and hydrocarbons containing said sulfur compounds. The sulfiding of the nickel catalyst is effected at about 220–400° C., preferably 280–380° C. in the presence of hydrogen gas under conditions such that the atomic ratio of sulfur to nickel in the final catalyst is as stated above.

DETAILED DESCRIPTION OF THE INVENTION

The present invention relates to an improved process for hydrodesulfurizing a hydrocarbon which contains sulfur compounds as impurities, and comprises treating said hydrocarbon with a hydrogen-containing gas.

According to the invention, in the hydrodesulfurization of hydrocarbons, most effective use is made of a hydrogen-containing gas which may further contain large amounts of carbon oxides, especially carbon monoxide which has heretofore been avoided in hydrodesulfurization. The process contemplates using such a gas and a catalyst having nickel as the principal metal component thereof, said nickel being combined with sulfur in a specific atomic ratio. The term "hydrocarbons" used herein does not necessarily mean individual hydrocarbon compounds, although individual hydrocarbons may be processed. Rather, it generally means mixtures of any one or more of linear hydrocarbons, naphthenic hydrocarbons, aromatic hydrocarbons, such as petroleum hydrocarbon fractions, cracked products thereof, coal tar fractions or natural gas.

After extensive and painstaking studies to find a way of eliminating the difficulties of the conventional hydrodesulfurization techniques as set forth above, and more particularly, to find an effective process which permits the use of a carbon monoxide, containing gas without causing methane to be formed and yet which is capable of perfectly accomplishing the hydrodesulfurization of the hydrocarbon, the inventors have now discovered that the foregoing purposes can be attained by the use of a catalyst of a specific composition and by conducting hydrogenation under specifically limited conditions. The present invention is based upon such findings, which will be described in more detail below.

The catalyst which is a part of the present invention itself and which is used in the process of the invention is nickel subsulfide and nickel constitutes the principal metal component thereof. The sulfur which is added to the nickel to form the catalyst is added in an amount sufficient to provide an atomic ratio of nickel to sulfur which is 1:0.5–0.8. It is essential that the nickel content of the catalyst be at least 60% by weight, of the total metal components constituting the catalyst. If desired, the metal components may consist, entirely, of nickel. Preferably, however, the catalyst also contains minor amounts of other metal components such as manganese, chromium, copper and zinc either solely or in plurality. The co-presence of manganese, chromium and copper are especially advantageous. The catalyst may be supported by a carrier and in such a case the appropriate range for the ratio of the metal components in the reduced state to the total catalyst is from 1 to 60% by weight, and the preferred construction of the catalyst is such that the metal components are deposited densely around the surface of the granular carriers.

The catalyst is prepared by reducing and sulfiding, prior to being used, a nickel catalyst which has been manufactured according to a known method. In the present invention, however, extreme importance attaches to the metal catalyst components and also to the degree to which they have been sulfided. A brief description of the catalyst will be given.

The catalyst employed in the present invention is nickel subsulfide in the solid state, and it consists essentially of nickel and sulfur in an atomic ratio of 1:0.5–0:8. The sulfiding agent which is used in the sulfiding of the nickel catalyst may be hydrogen sulfide; carbon disulfide; a hydrogen sulfide containing gas such as refinery off gas; or a sulfur compound such as a mercaptan, a disulfide, a thiophene; and hydrocarbons which contain said sulfur compounds. These sulfiding agents are employed in the presence of hydrogen gas under conditions such that the nickel catalyst is sulfided so as to have an atomic ratio of sulfur to nickel of 1:0.5–0.8. The sulfiding is effected at a temperature of about 220 to 400° C., preferably about 280 to 380° C.

In a particular example of the preparation of the catalyst, a nickel catalyst which has been made according to a known method is subjected to a reducing process, and a layer of reduced catalyst is subjected to a hydrogen-containing gas in a manner such that the ratio of the volume of hydrogen to one volume of catalyst is 500 per hour. To this is introduced a carbon disulfide gas at the rate of 10 volumes per hour. Then the layer of catalyst is gradually sulfided starting from the portion closest to the introduction of the carbon disulfide gas. The feed of the gases is discontinued when the atomic ratio of sulfur to nickel reaches a value ranging from 0.5 to 0.8 by averaging the values of the total metal components. Another example comprises the step of reducing, with the use of hydrogen, a catalyst which has been previously impregnated with nickel sulfate, and by this method there is obtained a catalyst which is equally effective.

The hydrocarbons to which the present process may be applied are those which have been defined above. More specifically, however, they include petroleum fractions such as gasoline, light oil, kerosene, naphtha or the like, thermally cracked gas of petroleum fractions such as natural gas, liquefied petroleum gas or naphtha, and hydrocarbon mixtures derived from coal tar.

Among the hydrogen containing gases used in the hydrodesulfurization process are coke oven gas, cracked gas resulting from the partial oxidation of hydrocarbons, steam-reforming gas of hydrocarbons, oxo synthesis gas, methanol synthesis gas, methanol convertor recycle gas, city gas and water gas. While these gases may be used directly in the process of the present invention, it is mandatory that the gases contain hydrogen in an amount of at least 10 mol percent. Also, since the gases listed above all contain CO and/or $CO_2$, attention is directed to the requirement that the total amount of CO and $CO_2$ must be not more than about 65% and preferably, the amount of $CO_2$ is 25% or less and that of CO is 40% or less. Moreover, the presence of such substances as methane, nitrogen, or the like in said hydrogen-containing gases does not substantially hamper the hydrodesulfurization, and an increase in the content of these substances contributes only to a reduction in the velocity of the reaction to a very limited degree, resulting from the fact that such increase in the content lowers the partial pressure of hydrogen. It is, however, undesirable if any oxides of nitrogen are contained in such gases.

The hydrodesulfurization process of the present invention is conducted at a temperature ranging from 200° C. to 450° C., and the preferred temperature is in the range from 250° C. to 400° C. The pressure of the reaction may range from atmospheric pressure to 100 kg./cm.$^2$. In view of the fact, however, that the reaction proceeds satisfactorily even under atmospheric pressure, it is not particularly necessary to use an extremely elevated pressure. The type of reaction vessel used does not constitute an essential feature of the present invention, but a reaction vessel of the adiabatic fixed bed type comprising one layer of packed catalyst which is of simple structurue may be used, since no substantial hydrogenation of carbon oxides, aromatic groups and paraffin groups takes place during the reaction, and thereby no marked heat generation occurs. This fact, i.e., no heat evolution is one of the most important advantages of the present invention.

The reaction is carried out by a simple procedure comprising the step of passing the mixture of the hydrocarbons which are to be purified and the hydrogen-containing gas intended for effecting hydrodesulfurization, through the layer of catalyst. The pattern of contacting the mixture with the catalyst is, in itself, not appreciable different from that of known methods. The ratio of the volume of feed to that of catalyst during the reaction may be that the feed is in the range from 0.2 to 30 per hour, in terms of liquid volume, to one volume of catalyst, while the ratio of hydrogen-containing gas to the feed may be that the former is in a range from 0.1 to 10 mols to one mole of the latter.

The velocity of hydrogenolysis of the sulfur compounds decreases with heavier compounds. It also varies with the structure of the compounds even if they are close to each other in molecular weight. In practice, therefore, the reaction conditions may have to be altered within the range of the aforementioned conditions, depending upon the type of raw feed and also upon the type of sulfur compounds contained therein. This fact, however, does not substantially affect the highly enhanced selectivity of hydrodesulfurization which is one of the features of the present invention. In the case, however, where conjugated dienes or acetylene are present in the gas which is fed to the layer of catalyst, these substances will be hydrogenated during the process of hydrodesulfurization and will be converted to olefins, while generating heat. For this reason, it is desirable from the viewpoint of controlling the reaction, to arrange it so that the total volume of the conjugated dienes and acetylene contained in the gas mixture fed to the catalyst layer be no greater than 10 mol percent of the volume of the hydrogen contained in said gas. While olefins are hydrogenated to some extent, the rate constant of such hydrogenation is smaller when compared to that of hydrogenolysis of the sulfur compounds, and therefore, the presence of olefins constitutes no danger to the reaction. The effects of components other than hydrocarbon are as have been described above. The catalyst used in the present invention is quite stable throughout the course of reaction, and does not undergo any change in composition during the hydrodesulfurization process. In the case, however, where the absence of sulfur compounds in the gas fed to the reaction vessel occurs for an extended duration of time, the nickel subsulfide will be reduced into a catalyst with a composition rich in metallic nickel which, in turn, may possibly cause hydrogenation of carbon monoxide to occur, though this could not happen in actual operation since the feed gas will always contain sulfur compounds. Even in such a case, however, if a sulfur compound such, for example, as hydrogen sulfide is provided in the feed gas, such danger as has been described immediately above is precluded.

The present invention is put to practice under the conditions as have been described above. It is important, however, to stress the advantages of the present invention, and therefore, they are ennumerated again as follows:

(1) The catalyst is of an enhanced selectivity, which means that its hydrogenation action never extends to carbon monoxide, and therefore, a gas containing carbon monoxide can be as directly used, without being previously purified, in the process of hydrodesulfurization, thereby dispensing with the provision of such purifying unit which is required in the conventional processes as have been described above.

(2) The scarcity of secondary reactions which cause heat generation contributes to the simplification of the structure and to the reduction in the size, of the reaction vessel.

(3) The enhanced stability of the catalyst permits an operation of long duration.

While the process of the present invention may be applied to a feed stock comprising hydrocarbons of various type, the use of this novel method on such matter, for example, as kerosene, will itself serve as the very means of refining the kerosene. In the case where the present invention is applied to a feed stock of low boiling point, the mixed gas after the reaction is useful as a fuel gas or as a feed gas for use in steam-reforming. Thus, the process of the present invention has, in fact, a wide variety of fields to which it can be applied.

In order that the present invention may be more clearly understood, some preferred embodiments of the present invention will now be described by way of example. It is to be noted, however, that these embodiments are described by way of example only, and that the scope of the present invention is not restricted thereto.

EXAMPLE 1

A fraction of liquefied butane (of which 10% was butylene) containing sulfur in the amount of 30 p.p.m. in addition to hydrogen sulfide was brought into contact with the catalyst together with a gas comprising 40% nitrogen, 30% carbon dioxide, 5% carbon monoxide and 25% hydrogen. From the gas formed after the hydrodesulfurization, hydrogen sulfide was removed by adsorption. The catalyst used, the conditions of the reaction and the composition of the gas formed in this example are stated below.

Catalyst: The catalyst used was prepared by immersing η-alumina carrier in amine complex salt so that the volume of nickel deposited on said carrier was 15% by weight of the catalyst. After drying, this was reduced at 300° C.,
and was then treated with hydrogen which contained hydrogen sulfide in the amount of 20 mol percent.

Conditions of the reaction:

| | |
|---|---|
| Temperature of reaction vessel _____° C__ | 270 |
| Pressure _____kg./cm.$^2$__ | 30 |
| Ratio of hydrogen-containing gas to feed stock (mol ratio) _____ | 0.2 |
| Velocity of charging feed stock (liquid) (to 1 volume of catalyst) _____volumes/hour__ | 25 |

Composition of gas after desulfurization (volume percent):

| | |
|---|---|
| $H_2$ _____ | 20.1 |
| CO _____ | 5.3 |
| $CO_2$ _____ | 32.0 |
| $N_2$ _____ | 42.6 |
| $CH_4$ _____ | 0.0 |
| Total _____ | 100.0 |

(Sulfur content: 3.1 p.p.m.)

Two comparative experiments were conducted under the same conditions as those in Example 1, one of which used a hydrogen-containing gas with the percentage of hydrogen being 100, while the other used a mixed gas comprising 25% nitrogen and 25% hydrogen. It was found that in the former, the amount of residual sulfur in the formed gas was 1.5 p.p.m., while with the latter case, the amount was 3.1 p.p.m. which is the same as that observed in Example 1. These experiments show that the method of Example 1 of the present invention produces a markedly superior result in desulfurization over the conventional method. As is also apparent from the composition of the formed gas, there occurred no hydrogenation of carbon monoxide.

EXAMPLE 2

Straight run naphtha was subjected to hydrosulfurization by using a hydrogen-containing gas which was of the same composition as that used in Example 1.

Nature of the naphtha used as the feed stock:

FRACTION CHARACTERISTICS

| | |
|---|---|
| Initial boiling point _____° C__ | 41 |
| 50% _____° C__ | 75 |
| End point _____° C__ | 128 |
| Specific gravity _____ | [1] 0.680 |
| Sulfur content _____p.p.m__ | 262 |

[1] 15/4° C.

Catalyst used: The catalyst used in this example was prepared by the following steps. To a diatomaceous earth-supported catalyst containing 46% Ni, 2.5% Cu, 2.5% Cr and 0.2 to 0.3% Mn and reduced at 220° C. were simultaneously supplied hydrogen and n-pentane containing 5 mol percent carbon disulfide at a feed ratio of 1 mol each, and thus sulfiding was performed so that the atomic ratio of sulfur to nickel was 0.79 to 1.

Conditions of reaction:

| | |
|---|---|
| Temperature of reaction vessel (average) ____° C__ | 340 |
| Pressure _____kg./cm.$^2$__ | 10 |
| Ratio of gas to feed stock (mol ratio) _____ | 0.2 |
| Velocity of charging feed stock (liquid) (to 1 volume of catalyst) _____volumes/hour__ | 4 |

The product formed was removed from the reaction vessel and was cooled to room temperature or to a temperature below room temperature to separate it into liquid matter and gaseous matter. The hydrogen which was dissolved in said liquid matter was rinsed with an aqueous solution of acidic cadmium chloride and the precipitations were removed. The residual sulfur content in said liquid product was 0.8 p.p.m., while no change in the amount of carbon monoxide in the gas was observed.

EXAMPLE 3

The same feed stock, hydrogen-containing and catalyst as used in Example 2 were used herein. Desulfurization was conducted under the same conditions as those for Example 2 except for that the velocity of charging of the feed stock was modified so that the feed stock was 3 parts by liquid volume to 1 volume of catalyst. In the present example, the residual sulfur in the refined liquid oil was as little as 0.3 p.p.m. The results show that prolonged duration of contact between the feed stock and the catalyst contributed to an even more perfect accomplishment of desulfurization in the case of naphtha. The present example is no exception in that there was no substantial consumption of carbon monoxide.

EXAMPLE 4

The same feed stock and catalyst as those in the preceding two examples were used. Hydrodesulfurization was conducted under the same conditions as those for said preceding examples, except that the composition of the hydrogen-containing gas and the reaction conditions were modified as described below.

COMPOSITION OF HYDROGEN-CONTAINING GAS

|  | Percent |
|---|---|
| Hydrogen | 10 |
| Carbon monoxide | 10 |
| Methane | 30 |
| Nitrogen | 50 |

CONDITIONS OF REACTION

| | |
|---|---|
| Temperature of reaction vessel ° C. | 340 |
| Pressure kg./cm.$^2$ | 12 |
| Ratio of gas to feed stock (mol ratio) | 0.2 |
| Velocity of charging feed stock (liquid) (to 1 volume of catalyst) volumes/hour | 4 |

The amount of residual sulfur in the refined oil in the present example was 1 p.p.m. which corresponds to a desulfurization rate of 99.6%. This clearly shows that satisfactory desulfurization is as equally available even where the concentration of hydrogen is low and that of carbon monoxide is high.

EXAMPLE 5

The same catalyst as used in the preceding example was used. A mixture of toluene and thiophene which was added so that the total sulfur content was 400 p.p.m. by weight of sulfur was subjected to hydrodesulfurization in a mixed gas comprising 60% hydrogen and 40% carbon monoxide.

CONDITIONS OF REACTION

| | |
|---|---|
| Temperature of reaction vessel ° C. | 340 |
| Pressure kg./cm.$^2$ | 50 |
| Ratio of gas to feed stock (mol ratio) | 0.2 |
| Velocity of charging feed stock (liquid) (to 1 volume of catalyst) volumes/hour | 2.5 |

The residual sulfur content in the refined toluene in this example was 10 p.p.m., corresponding to a desulfurizing rate of 97.5%. This shows that according to the process of the present invention, a satisfactory result of hydrodesulfurization is attained even when hydrocarbons with a large amount of sulfur content are treated with a hydrogen-containing gas which contains a very large amount of carbon monoxide.

EXAMPLE 6

In a precipitate containing 37 gm. of nickel and comprising a basic nickel carbonate and a nickel hydroxide was mixed 100 gm. of diatomaceous earth, and pellets obtained by pelletizing said mixture were heated at 350° C. in air to decompose the nickel compounds. The mixture was heated at a temperature ranging from 380° to 400° C. thereby obtaining a catalytic composition. Said composition was subjected to pre-sulfiding by the use of $H_2$ gas containing 1.5 vol. percent of $H_2S$ for 11 hours under the following conditions:

| | |
|---|---|
| Temperature ° C. | 320 |
| Pressure kg./cm.$^2$ | 5 |
| Space velocity | 5,000 |

This sulfided catalyst was analyzed and consists of 98.8 wt. percent $Ni_3S_2$ (nickel subsulfide) and 1.2 wt. percent Ni; the atomic ratio (S/Ni) thereof being 0.65.

A gas of the following composition and naphtha with properties as described below where brought into contact with said sulfided catalyst under the conditions: a mo₁ ratio of 0.3, temperature of 280° C., pressure of 18 kg./cm.$^2$ and LHSV of 8. The sulfur content in the normally liquid product free from $H_2S$ was 0.8 p.p.m. No methanation of CO and $CO_2$ occurred.

PROPERTIES OF FEED NAPHTHA

| | | |
|---|---|---|
| Specific gravity | | 0.683 |
| ASTM Distillation: | | |
| I.B.P. | ° C. | 43 |
| 50% | ° C. | 85 |
| E.P. | ° C. | 139 |
| Total S-content | wt. p.p.m. | 286 |
| ($H_2S$ content) | | 0 |

COMPOSITION OF GAS

| | Vol. percent |
|---|---|
| $CH_4$ | 60.2 |
| CO | 0.7 |
| $CO_2$ | 21.4 |
| $H_2$ | 17.7 |

After 220 hours successive contact, a measurement of the atomic ratio (S/Ni) of the catalyst located at the upper, middle and lower portions of the catalyst bed was made. It was found that the atomic ratio of the catalyst at the upper portion was 0.65 (98.8 wt. percent $$Ni_3S_2 + 1.2 \text{ wt. percent Ni}),$$

that of the catalyst at the middle portion 0.68 (95.5 wt. percent $Ni_3S_2$+4.5 wt. percent NiS) and that of the catalyst at the lower portion 0.65 (92.1 wt. percent $$Ni_3S_2 + 7.9 \text{ wt. percent NiS})$$

The said catalytic composition was subjected to pre-sulfiding by use of hydrogen gas containing 0.8 vol. percent of $H_2S$ for 11 hours under the conditions: temperature of 320° C., pressure of 5 kg./cm.$^2$ gauge and space velocity of 4000 to prepare a different sulfided catalyst. This catalyst was contacted with the aforesaid naphtha and gas under the same conditions as defined above. The sulfur content in the normally liquid product free from $H_2S$ was 58 wt. p.p.m., and the gaseous product was seen to contain 78.4 vol. percent of $CH_4$ 21.3 vol. percent $CO_2$ and traces of $CO_2$ and $H_2$. Therefore, hydrogen was consumed for methanation of CO and $CO_2$. The atomic ratio of sulfur to nickel measured in the catalyst located at the upper, middle and lower portions of the catalyst bed was 0.42 (69.2 wt. percent $Ni_3S_2$+30.8 wt. percent Ni) at the upper portion, 0.39 (66.3 wt. percent $Ni_3S_2$+33.7 wt. percent Ni) at the middle portion and 0.39 (85.5 wt. percent $Ni_3S_2$+14.5 wt. percent NiS) at the lower portion, respectively.

These results indicate the criticality of the catalyst prepared according to the invention.

EXAMPLE 7

The catalytic composition used in Example 6 was subjected to pre-sulfiding by the use of naphtha containing 1.0 wt. percent of carbon disulfide for 3 hours under the conditions: temperature of 320° C., pressure of 11 kg./cm.$^2$, LHSV of 20, a mol ratio of $H_2$ naphtha of 0.8. The thus obtained sulfided catalyst was analyzed and found to have an atomic ratio (S/Ni) 0.73 and to consist of 78.9 wt. percent $Ni_3S_2$ and 21.1 wt. percent NiS.

A gas of the following composition and naphtha with the properties as described below were brought into contact with the sulfided catalyst under the conditions: a mol ratio of 0.3, temperature of 340° C., pressure of 25 kg./cm.$^2$ and LHSC of 4. The sulfur content in the normally liquid product free from $H_2S$ was 2 wt. p.p.m. The presence of methane in the gaseous product was not observed.

PROPERTIES OF FEED NAPHTHA

Specific gravity ---------------------------- 0.692
ASTM distillation:
I.B.P. ---------------------------- ° C-- 41
50% ------------------------------ ° C-- 92
E.P. ----------------------------- ° C-- 149
Total S-content ----------------- wt. p.p.m-- 1920
$H_2S$ content 2 wt. p.p.m.)

COMPOSITION OF GAS

| | Vol. percent |
|---|---|
| CO | 42.1 |
| $CO_2$ | 24.7 |
| $H_2$ | 33.2 |

After 150 hours successive contact, measurement of the atomic ratio of sulfur to nickel of the catalyst was made to find that the atomic ratio at every portion of the catalyst bed ranged approximately from 0.71 to 0.72. This catalyst was analyzed and consisted of 82.2 wt. percent $Ni_3S_2$ and 17.8 wt. percent NiS.

What is claimed is:

1. A process for hydrodesulfurizing a hydrocarbon containing sulfur compounds, said process comprising contacting said hydrocarbon with a gas in a ratio of 0.1–10 moles of hydrocarbon to 1 mole of gas at a temperature of 200–450° C. and a pressure up to 100 kg./cm.$^2$ in the presence of a catalyst, said catalyst being present in an amount of 1 volume per 0.2 to 30 volumes of hydrocarbon, said gas containing hydrogen and carbon oxides, the hydrogen being present in an amount of at least 10 mol percent of said gas and said carbon oxides containing carbon monoxide in an amount to provide between 5 and 40 mol percent of said gas, the total amount of carbon oxides being less than 65 mol percent of said gas, said catalyst consisting essentially of nickel subsulfide in the solid state, the contact of the hydrocarbon and the said gas resulting in hydrogenolysis of only the sulfur compounds contained in said hydrocarbon without substantial hydrogenation of said carbon monoxide.

2. A process as claimed in claim 1, wherein said carbon oxides in said gas contains not more than about 25% of carbon dioxide.

3. A process as claimed in claim 1, wherein said gas is selected from the group consisting of coke oven gas, cracked gas resulting from partial oxidation of a hydrocarbon, steam-reforming gas of a hydrocarbon, oxo synthesis gas, methanol synthesis gas, methanol converter recycle gas, city gas and water gas.

4. A process as claimed in claim 1, including an additive to said catalyst which comprises a metal selected from the group consisting of manganese, chromium, copper and zinc.

5. A process as claimed in claim 1 including an additive to said catalyst which comprises at least two metals selected from the group consisting of manganese, chromium, copper and zinc.

6. A process as claimed in claim 5, wherein said additive further comprises manganese, chromium and copper.

7. A process as claimed in claim 1 wherein said catalyst is prepared by sulfiding a nickel catalyst at a temperature of 220–400° C. with an amount of a sulfiding agent and hydrogen gas.

8. A process as claimed in claim 1 which includes diatomaceous earth in the catalyst.

References Cited

UNITED STATES PATENTS

| 2,995,511 | 8/1961 | Herbert et al. | 208—217 |
| 2,884,370 | 4/1959 | Nonnenmacher et al. | 208—217 |
| 3,012,963 | 12/1961 | Archibald | 208—217 |

OTHER REFERENCES

Kirkpatrick, Wm. J., "Nickel Sulfide Catalysts" in Advances in Catalysis, vol. III (1951), pp. 329–339.

DELBERT E. GANTZ, Primary Examiner

G. J. CRASANAKIS, Assistant Examiner

U.S. Cl. X.R.

208—216; 252—470, 471, 473